United States Patent Office 3,833,673
Patented Sept. 3, 1974

3,833,673
SYNTHESIS OF ALKYLATED PHENOLS FROM CARBONYL COMPOUNDS
Kent C. Brannock, Kingsport, and Charles W. Hargis, Johnson City, Tenn., assignors to Eastman Kodak Company, Rochester, N.Y.
No Drawing. Filed Nov. 9, 1971, Ser. No. 197,124
Int. Cl. C07c 39/06
U.S. Cl. 260—621 R  8 Claims

ABSTRACT OF THE DISCLOSURE

Alkylated phenols such as mono-, di-, tri- or tetra-methylphenols are synthesized from carbonyl compounds, with or without an alcohol, by passing the reactants over a lithium phosphate or magnesium oxide catalyst at a temperature of between about 450° and 600° C. The carbonyl compounds include, for example, acetone, isophorone and isobutyraldehyde, while the alcohol may be methanol. The alkylated phenols are useful as intermediates in the production of vitamin E, germicidal materials and resin or polymer products.

This invention relates to the catalytic synthesis of alkylated phenols from carbonyl compounds, or carbonyl compounds in admixture with an alcohol, by passing the reactants over a lithium phosphate or magnesium oxide catalyst at elevated temperatures. More specifically, the present invention is directed to a catalytic process for the economic conversion of selected acyclic or cyclic ketones and aldehydes, with or without methanol, to alkylated compounds, particularly nuclear methyl-substituted phenols.

It is known that certain of the alkylated and particularly the methylated phenols are very valuable in the production of intermediates to be used in the synthesis of vitamin E (alpha tocopherol). Thus, 2,3,5-trimethylphenol, one of the alkylated phenols principally concerned in the instant specification, is used to produce trimethyl hydroquinone which is later reacted with phytyl bromide to produce alpha tocopherol, one of the most potent of the known antisterility factors of the vitamin E group. The alkylated phenols also find utilization in the production of synthetic resins or plastics. For example, 3-5-dimethylphenol is particularly suited for use in the manufacture of phenol-formaldehyde type resins because the formaldehyde may react with any and all of the 2, 4 and 6 positions of the aromatic nucleus of the alkylated phenols, while the alkyl radicals on the 3 and 5 positions of the phenol increase the solubility of the formed resin in drying oils.

Although several methods are known whereby alkylated phenols can be produced from reactant solutions containing a mono-cyclic, non-aromatic nucleus of six carbon atoms, none of these methods have proven to be particularly attractive from a commercial standpoint. For example, it has been known that alkylated phenols can be produced by brominating isophorone in 1,2,4-trichlorobenzene and refluxing the resulting solution until the evolution of hydrogen bromide ceases thereby yielding mixtures of 2,3,5-trimethylphenol and 3,4,5-trimethylphenol in a ratio of about 1:3. Isophorone has also been converted to 2-chloroisophorone and then treated with an aqueous solution of mineral acid under autogenous pressure to give 3,4,5-trimethylphenol in major amounts in admixture with 2,3,5-trimethylphenol in minor amounts. Phenols having at least one ortho hydrogen have been methylated in the ortho-position by passing a mixture of such phenols together with 2,4,6-trimethylphenol over a magnesium oxide or calcium phosphate catalyst bed at a catalyst bed temperature of from 475° C. to 600° C.

French Pat. 1,538,224 suggests that isophorone can be demethanized at 600–650° C. to form 3,5-dimethylphenol which is then methylated by added methanol to form 2,3,5-trimethylphenol over a catalyst of aluminum oxide, cuprous oxide and chromium oxide containing an alkaline oxide such as potassium oxide, or phosphates, of iron, aluminum, cobalt and calcium. An attempt to duplicate the results reported in this patent with its preferred catalyst for making 2,3,5-trimethylphenol from a mixture of isophorone and methanol produced predominantly 3,5-dimethylphenol with only minor amounts of the desired trimethylphenol.

As will be appreciated, these prior known methods leave much to be desired since they all use a number of intermediate reactants, rather expensive starting materials, and give very limited or appreciably no yield of the desired alkylated phenols. Thus, it can be seen that there exists a real need for a process by which selected alkylated phenols can be easily and economically synthesized from readily available, inexpensive reactants on a commercial scale. Ideally, the process should employ mild operating conditions with high yields and conversion.

Therefore, an object of the present invention is to provide a process for the synthesis of selected alkylated phenols.

Another object of this invention is to provide a process for the vapor-phase synthesis of alkylated phenols from carbonyl compounds.

Yet another object of this invention is to provide a process for the conversion of acyclic or cyclic ketonic compounds to a mixture which is selectively either predominantly cresol, 3,5-dimethylphenol, 2,3,5-trimethylphenol, 2,3,6-trimethylphenol, 2,3,5,6-tetramethylphenol or varying mixtures thereof.

A further object of this invention is to provide a process for the synthesis of alkylated phenols by the vapor-phase rearrangement of either acetone, with or without methanol or isobutyraldehyde, isophorone or aliphatic alcohols in the presence of a lithium phosphate or magnesium oxide catalyst at elevated temperatures.

These and other objects and advantages of this invention will become apparent from the following description and claims.

In accordance with this invention, it has been found that 2,3,5-trimethylphenol, in admixture with o-, m-, or p-methylphenol (i.e., cresol) 3,5-dimethylphenol, 2,3,6-trimethylphenol and 2,3,5,6-tetramethylphenol in selected amounts, can be produced by a commercially feasible process comprising the vapor-phase ring closing and/or dehydrogenative-dehydration rearrangement of certain selected carbonyl compounds at an elevated temperature over either a lithium phosphate or magnesium oxide catalyst. The process can be run with or without an alcohol or aldehyde to give various admixtures of alkylated phenols. When desirable, the cresol, 3,5-dimethylphenol and 2,3,5,6-tetramethylphenol contents of the admixtures may be recycled to gain increased production of trimethyl phenol.

The mechanics of the process consist of contacting the carbonyl compound (or a mixture of carbonyl compounds), with or without an alcohol, with the selected catalyst of this invention in a reaction zone at a temperature between about 450° C. to about 600° C. The process may be effected in a batch, intermittent or continuous manner. However, since the reaction is effected in the vapor-phase, and since it is necessary to maintain the reactants at the reaction temperature for a predetermined limited period of time, it is generally preferred to carry out the process in a continuous manner in which case the starting material may be vaporized in a separate chamber or the front section of the reaction chamber and then passed through the reaction zone at the optimum temperature and the desired space velocity. As an alternative, the liquid reactants may be vaporized in the reaction chamber proper.

The process of this invention can be carried out in any type of reactor used for vapor-phase reactions in which the reactants and catalyst are brought into intimate contact for a sufficient length of time to accomplish the desired reaction. For example, a conventional fixed-bed tubular reactor, a fluidized bed reactor or a moving bed reactor may be employed. It is generally preferred to employ a tubular reactor; for example, a glass or metal tube which is filled with a static bed of the catalyst. The reactor can be heated by any conventional means, such as, for example, by surrounding the reactor with an electrical heater, a heated gas, or a liquid such as a fused salt bath, liquid metal, etc., which can be conveniently maintained at the reaction temperature by use of an immersion-type electrical heater. Because of the good heat transfer between a liquid and the reactor walls, a fused salt bath or other liquid medium generally gives the best temperature control of the reaction, although any means of heating may be used.

The process is operable within wide ranges of temperature, pressure and contact time. However, because of sensitivity of organic compounds to changes in temperature under ring closing and/or dehydrogenative-dehydration rearrangement conditions, consideration must be given to the relation of operating variables. For instance, the permissible range of contact time will be different at various temperatures within the preferred temperature range. With increase in temperature, the contact time must be decreased commensurately to avoid excessive consumption of organic feed stock in side-reactions. The optimum contact time will be a function of the organic reactants and catalysts chosen and of the reaction temperature, but will usually fall within the range from about 0.1 to 75 seconds. The term "contact time" as used herein is defined as the time required for the gaseous feed mixture to fill a volume equal to the bulk volume of the catalyst at the temperature and pressure employed in the process.

The pressure at which the process is operated is not narrowly critical and can range from subatmospheric pressure to superatmospheric pressure in addition to normal atmospheric pressure. Since the reaction of this invention proceeds smoothly at atmospheric pressure thereby eliminating the need for expensive equipment which is required for operations carried out at other pressures, the process of this invention is preferably carried out at atmospheric pressure for economic reasons. It is, of course, obvious to those skilled in the art that the pressure should be adjusted so as to maintain the reactants in the vapor phase when passing over the catalyst bed at the temperature at which the reaction is conducted.

The reaction temperature may be varied between about 450° C. and about 600° C. depending on the selection of the catalyst used, on the degree of conversion desired and the composition of product to be obtained. At temperatures below about 450° C. the reaction time of the process increases to such a degree that it is no longer of commercial interest. Thus, temperatures below about 450° C. are generally not acceptable. Temperatures above 600° C. are to be avoided because of excessive decomposition of the nuclear carbon structure of the reactants and products and the carbonization of the catalyst with resultant loss of its activity. It is preferred that the process of this invention be conducted at a temperature range from about 465° to about 550° C.

In some cases it may be desirable or even advantageous to employ an inert diluent or solvent, in admixture with the reactant for the purpose of, for example, equalizing the temperature of the reaction zone, promoting a more uniform reaction rate, metering the reactant into the reaction zone, restricting the amount of undesirable side reactions such as the disruption of the nucleus, and even for the purpose of increasing the catalyst life. Toluene, xylene and other aromatic hydrocarbons, as well as hydrogen or steam, may be employed individually or in combination with each other as a diluent and in amounts adapted to the particular feed material, residence time, temperature and specific catalyst employed. In some cases, it may be advantageous to dilute the vapor stream with nitrogen or other inert gas to control the temperature in the reaction zone, to reduce the rate of side reactions, and to facilitate removal of reaction products from the reaction zone. The optimum ratio of the volume of diluent gas per volume of organic vapor will depend upon the reactants being used and the reaction temperature and contact time but will usually be within the range from 0 to 2.0 volumes inert gas per volume of organic vapor.

In certain instances it may be desirable to vary the ratio at which each alkylated phenol in the admixture is produced. The ratio at which the alkylated phenols are produced in the process of this invention can be controlled or varied within limits in either of two ways. In the first instance, an alcohol having from 1 to 4 carbon atoms (i.e., methanol, ethanol, propanol and butanol) is added to the aliphatic or cyclic ketone. In the second instance an aldehyde having from 1 to 6 carbon atoms (i.e., formaldehyde, acetaldehyde, propionaldehyde, normal and isobutyraldehyde, valeraldehyde and caproaldehyde) is added to the aliphatic ketone. Under certain conditions both an alcohol and aldehyde may be blended together and reacted with selected ketones. The alcohols and aldehydes can be mixed with the ketones to form a solution which is then vaporized and fed into the reaction zone. Alternately, separate streams of the reactants may be fed to the same or separate vaporizers and then to the reactor. If desirable, the reactants may be vaporized in the reaction chamber proper.

The molar ratio of alcohol to acyclic or cyclic ketone reactants can be varied from about 0:1 to about 5:1 to give the desired admixture of alkylated phenols. For example, when the ratio of methanol to isophorone is 0:1, 3,5-dimethylphenol is the principal product of the reaction. When the molar ratio is raised to 5:1, the principal product is 2,3,5,6-tetramethylphenol. At intermediate ratios of the reactants, varying amounts of 3,5-dimethylphenol, 2,3,5-trimethylphenol and 2,3,5,6-tetramethylphenol are produced and may be controlled within limits by adjusting the ratio of alcohol to ketone in the feed. Little advantage is realized in the use of molar ratios of alcohol to acyclic or cyclic ketone higher than 5:1 since little improvement in the production of 2,3,5,6-tetramethylphenol is gained at higher ratios. When an alcohol is added to the ketone reactants, unchanged alcohol which survives the reaction may be recovered and recycled.

The molar ratio of aldehyde to aliphatic ketone can also be varied from about 0:1 to about 5:1 although it is normally desirable to maintain the ratio within from about 0:1 to 3:1. For example, when the ratio of isobutyraldehyde to acetone is 0:1, 3,5-dimethylphenol is the principal product of the reaction. When the molar ratio is raised to 2:1, the principal product produced is monomethylphenol (i.e., m- and p-cresol). At intermediate ratios of the reactants, varying amounts of the mono- di-, tri- and tetramethylphenol products are produced and may be controlled within limits by varying the ratio of aldehyde to ketone in the feed stock. Very little advantage is realized in the use of molar ratios of aldehyde to ketone higher than 5:1. If desirable, any aldehyde or ketone which survives the reaction may be recovered and recycled.

The reaction products, which are in the form of a vapor, from the reactor are collected, condensed and separated in any known manner such as, for example, by crystallization, distillation or the like. Since the reaction is preferably run at atmospheric pressure, no expensive pressure equipment is normally needed for the collection and separation of the reaction products. To achieve maximum yields it is desirable for any reactant which has passed through the reaction zone unchanged to be collected and recycled. If the yield of trimethylphenol is to be maximized, then it may also be desirable to recycle the cresol, 3,5-dimethylphenol and 2,3,5,6-tetramethylphenol products.

The magnesium oxide catalyst which can be employed in this process may be derived from any magnesium compound which can be decomposed to form the oxide. For example, the oxide may be derived from magnesium carbonate, basic magnesium carbonate or magnesium hydroxide. The basic carbonate can be compressed into a hard physical form by application of 5000 p.s.i.g. pressure on the carbonate contained in a plastic or rubber bag surrounded by water. Thermal decomposition of this mass after reduction to the desired particle size yields firm granules having considerable surface area and reactivity. Fine particles of the catalyst are preferred because more surface area per unit of volume will be available for contact with the organic vapor.

The lithium phosphate catalysts may be prepared from lithium hydroxide and sodium orthophosphate in accordance with the procedure set forth in U.S. Pat. 2,986,585. If desirable, the lithium phosphate catalysts may be supported on or in admixture with a support such as silica, alumina or other suitable material. Such mixtures offer the advantage of increased contact with reactants and greater ease of regeneration.

The invention will be further illustrated by the following examples and it should be understood that these examples are set forth for purposes of illustration only and are not to be construed as limiting the invention in any manner.

EXAMPLE 1

During a period of 60 minutes, a 50 ml. sample of granular lithium phosphate contained in a 1-inch O.D. Vycor tubular reactor 33 inches long and heated at 530° C. by a 3-element electric furnace is contacted with 0.576 mole of isophorone. The reaction effluent is collected in receivers cooled to 10° C. and −80° C. Analysis of the product by gas chromatography showed 0.038 mole of unchanged isophorone, 0.434 mole of 3,5-dimethylphenol and 0.034 mole of 2,3,5-trimethylphenol. Thus, the conversion to and yield of 3,5-dimethylphenol are 75.4% and 80.7%, respectively, while the values for 2,3,5-trimethylphenol are 5.9% and 6.3%, respectively.

EXAMPLE 2

During a period of 92 minutes, a 50 ml. sample of granular lithium phosphate heated at 505° C. in the reactor of Example 1 is contacted with a mixture consisting of 0.467 mole of isophorone and 0.467 mole of methanol. Collection and analysis of the product as in Example 1 shows a production of 3,5-dimethylphenol corresponding to 47.9% conversion and 49.0% yield; of 2,3,5-trimethylphenol corresponding to 24.5% conversion and 25.0% yield; of 2,3,6-trimethylphenol corresponding to 2.9% conversion and 3.0% yield; and of 2,3,5,6-tetramethylphenol corresponding to 9.9% conversion and 10.1% yield based on isophorone. Thus, as may be seen by a comparision with the results obtained in Example 1, the addition of methanol to the isophorone feed results in a considerable increase in the amount of 2,3,5-trimethylphenol produced and the production of 2,3,6-trimethylphenol and 2,3,5,6-tetramethylphenol, while the production of 3,5-dimethylphenol declines.

EXAMPLE 3

During a period of 180 minutes, a 50 ml. sample of granular lithium phosphate heated to 505° C. in the reactor of Example 1 is contacted with 0.615 mole of acetone. Collection and analysis of the reactor effluent as in Example 1 shows 0.068 mole of 3,5-dimethylphenol and 0.217 mole of unchanged acetone. In accordance with the reaction stoichiometry requiring 3 moles of acetone per mole of the dimethylphenol produced, the conversion of acetone fed to 3,5-dimethylphenol is 33.2% and the yield of phenol based on acetone consumed is 51.3%. Product analysis also shows the presence of mesityl oxide, isophorone, m-cresol and p-cresol, all of which may be recovered and used or, if desirable, recycled to increase the yield of dimethylphenol produced.

EXAMPLE 4

During a period of 60 minutes, a 50 ml. sample of granular lithium phosphate heated at 505° C. in the reactor of Example 1 is contacted with a mixture consisting of 0.096 mole of acetone and 0.192 mole of methanol. The product is collected and heated under a reduced pressure to remove low-boiling components. Analysis of the phenol residue by gas chromatography shows 8.3% conversion to 3,5-dimethylphenol, 10.5% conversion to 2,3,5-trimethylphenol, 14.0% conversion to 2,3,6 - trimethylphenol and 17.7% conversion 2,3,5,6 - tetramethylphenol. By adjusting the ratio of acetone to methanol, considerable flexibility in product composition can be obtained, thereby permitting emphasis on the prodution of a particular component or component mixture.

EXAMPLE 5

During a period of 60 minutes, a 50 ml. sample of granular magnesium oxide heated at 505° C. in the reactor of Example 1 is contacted with a mixture consisting of 0.096 mole of acetone and 0.192 mole of methanol. The product is collected and heated under a reduced pressure to remove low-boiling components. Analysis of the phenol residue by gas-chromatography shows about 6.5% conversion to 3,5 - dimethylphenol; 15% conversion to 2,3,5-trimethylphenol; 20% conversion to 2,3,6-trimethylphenol and 25% conversion to 2,3,5,6-tetramethylphenol.

EXAMPLE 6

During a period of 180 minutes, 1.216 moles of acetone is contacted with a 50 ml. sample of granular magnesium oxide heated at a temperature of 500° C. in the Vycor reactor of Example 1. Collection of the product and analysis as in Example 1 shows the production of the following components as indicated based on acetone fed and consumed:

| Component produced | Percent Conversion | Yield |
|---|---|---|
| Misityl oxide | 5.5 | 11.8 |
| Isophorone | 1.8 | 3.8 |
| m- and p-Cresols | 2.0 | 3.5 |
| 3,5-dimethylphenol | 19.1 | 40.7 |
| 2,3,5-trimethylphenol | 1.9 | 4.0 |

EXAMPLE 7

During a period of 60 minutes, a 50 ml. sample of granular lithium phosphate heated at 525° C. is contacted with a mixture containing 0.058 mole of acetone and 0.116 mole of isobutyraldehyde in the reactor of Example 1. Collection of the product and analysis as in Example 1 shows 0.02 mole of a cresol fraction containing approximately equal amounts of m-cresol and p-cresol. In accordance with a reaction stoichiometry requiring one mole of each of the starting carbonyl compounds to produce a mole of the phenolic fraction, the conversion to combined m- and p-cresols amounts to 34.5% based on acetone.

Instead of a carbonyl compound as the starting source of the alkylated phenols, there may be used an alcohol which is dehydrogenated to the desired carbonyl compound under the operating conditions employed. The substitution of isopropyl alcohol for acetone in the production of 3,5-dimethylphenol is illustrated in the following example.

EXAMPLE 8

During a period of 130 minutes, a 50 ml. sample of granular lithium phosphate heated at 500° C. is contacted with 0.425 mole of isopropyl alcohol in the reactor of Example 1. Collection of the product and analysis as in Example 1 shows substantially complete consumption of the starting alcohol and a conversion to and yield of 3,5-dimethylphenol amounting to 14.8%. Acetone, mesityl oxide, isophorone and 2,3,5-trimethylphenol are also found in the product.

The invention has been described in considerable detail with particular reference to certain preferred embodiments thereof, but it will be understood that variations and modifications can be effected within the spirit and scope of the invention.

We claim:

1. Process for the production of methylated phenols which comprises passing acetone or acetone admixed with methanol in the vapor phase over a catalyst selected from the group consisting of lithium phosphate and magnesium oxide at a temperature of from between about 450° C. and 600° C. and thereafter removing the methylated phenols.

2. The process of Claim 1 wherein the temperature is from between about 465° C. and 550° C.

3. The process of Claim 1 wherein the contact time of the reaction of the acetone with the catalyst is between about 0.1 to about 75 seconds.

4. The process of Claim 1 wherein an inert diluent is fed in admixture with acetone over the catalyst.

5. The process of Claim 1 wherein a molar ratio of methanol to acetone of less than about 5:1 is employed.

6. The process of Claim 5 wherein the temperature is from between about 465° C. and about 550° C.

7. The process of Claim 5 wherein the contact time of the acetone and methanol with the catalyst is between about 0.1 and about 75 seconds.

8. The process of Claim 5 wherein an inert diluent is fed in admixture with the reactants over the catalyst.

References Cited

UNITED STATES PATENTS 3,446,856   5/1969   Hamilton _____ 260—621 R X

FOREIGN PATENTS 1,131,940   10/1968   Great Britain _____ 260—621 R
588,099   5/1947   Great Britain _____ 260—621 R LEON ZITVER, Primary Examiner D. B. SPRINGER, Assistant Examiner U.S. Cl. X.R.

252—437, 475; 260—586 R, 593 R